(12) United States Patent
McCurry et al.

(10) Patent No.: US 11,538,128 B2
(45) Date of Patent: Dec. 27, 2022

(54) USER INTERFACE FOR FRAUD ALERT MANAGEMENT

(71) Applicant: Verint Americas Inc., Alpharetta, GA (US)

(72) Inventors: Tim McCurry, Duluth, GA (US); Michael N. Mandato, Canton, GA (US)

(73) Assignee: Verint Americas Inc., Alpharetta, GA (US)

( * ) Notice: Subject to any disclaimer, the term of this patent is extended or adjusted under 35 U.S.C. 154(b) by 606 days.

(21) Appl. No.: 16/411,626

(22) Filed: May 14, 2019

(65) Prior Publication Data

US 2019/0347752 A1 Nov. 14, 2019

Related U.S. Application Data

(60) Provisional application No. 62/671,046, filed on May 14, 2018.

(51) Int. Cl.
*G06F 3/0482* (2013.01)
*G06F 3/0481* (2022.01)
(Continued)

(52) U.S. Cl.
CPC ......... *G06Q 50/265* (2013.01); *G06F 3/0481* (2013.01); *G06F 3/0482* (2013.01);
(Continued)

(58) Field of Classification Search
CPC ............. H04L 63/1433; H04L 41/0627; H04L 43/045; H04L 12/1813; H04L 65/1076;
(Continued)

(56) References Cited

U.S. PATENT DOCUMENTS

| 4,653,097 A | 3/1987 | Watanabe et al. |
| 4,823,380 A | 4/1989 | Kohen et al. |

(Continued)

FOREIGN PATENT DOCUMENTS

| DE | 202008007520 | 8/2008 |
| EP | 0598469 | 5/1994 |

(Continued)

OTHER PUBLICATIONS

Evmorfia N. Argyriou et al., A Fraud Detection Visualization System Utilizing Radial Drawings and Heat-maps, Jan. 1, 2014, IEEE Xplore, pp. 1-8 (Year: 2014).*

(Continued)

*Primary Examiner* — Tam T Tran
(74) *Attorney, Agent, or Firm* — Meunier Carlin & Curfman LLC

(57) ABSTRACT

A user interface for a fraud detection application includes a visual display; a plurality of panes displayed on the visual display, each pane including an identifier corresponding to a communication received; a graphical representation of a threat risk associated with the identifier; a numeric score associated with the threat risk, wherein the numeric score is a weighted score based on a plurality of predetermined factors updated substantially continuously. The graphical representation may include a status bar indicative of a threat risk associated with the identifier, the threat risk provided by the fraud detection algorithm and based on a weighted score. Each pane may include additional information about the identifier, such as a number of accounts accessed or attempted to be accessed associated with the identifier; a number of days the identifier has been active; a type of channel associated with the identifier; and a number of communications initiated by the identifier over a predetermined period of time. A user may access further information (Continued)

by activating a portion of the visual display to access additional information related to the threat risk. The communication may be a phone call, a chat, a web interaction or the like.

18 Claims, 6 Drawing Sheets

(51) Int. Cl.
  *G06Q 50/26* (2012.01)
  *H04M 3/493* (2006.01)
  *H04L 12/18* (2006.01)
  *H04L 65/1076* (2022.01)
(52) U.S. Cl.
  CPC ...... *H04L 12/1813* (2013.01); *H04L 65/1076* (2013.01); *H04M 3/493* (2013.01)
(58) Field of Classification Search
  CPC ... G06Q 50/265; G06F 3/0481; G06F 3/0482; H04M 3/493
  See application file for complete search history.

(56) References Cited

U.S. PATENT DOCUMENTS

| | | |
|---|---|---|
| 4,864,566 A | 9/1989 | Chauveau |
| 4,930,888 A | 6/1990 | Freisleben et al. |
| 5,027,407 A | 6/1991 | Tsunoda |
| 5,222,147 A | 6/1993 | Koyama |
| 5,638,430 A | 6/1997 | Hogan et al. |
| 5,805,674 A | 9/1998 | Anderson, Jr. |
| 5,907,602 A | 5/1999 | Peel et al. |
| 5,946,654 A | 8/1999 | Newman et al. |
| 5,963,908 A | 10/1999 | Chadha |
| 5,999,525 A | 12/1999 | Krishnaswamy et al. |
| 6,044,382 A | 3/2000 | Martino |
| 6,145,083 A | 11/2000 | Shaffer et al. |
| 6,266,640 B1 | 7/2001 | Fromm |
| 6,275,806 B1 | 8/2001 | Pertrushin |
| 6,427,137 B2 | 7/2002 | Pertrushin |
| 6,480,825 B1 | 11/2002 | Sharma et al. |
| 6,510,415 B1 | 1/2003 | Talmor et al. |
| 6,587,552 B1 | 7/2003 | Zimmerman |
| 6,597,775 B2 | 7/2003 | Lawyer et al. |
| 6,915,259 B2 | 7/2005 | Rigazio |
| 7,006,605 B1 | 2/2006 | Morganstein et al. |
| 7,039,951 B1 | 5/2006 | Chaudhari et al. |
| 7,054,811 B2 | 5/2006 | Barzilay |
| 7,106,843 B1 | 9/2006 | Gainsboro et al. |
| 7,130,800 B1 | 10/2006 | Currey et al. |
| 7,158,622 B2 | 1/2007 | Lawyer et al. |
| 7,212,613 B2 | 5/2007 | Kim et al. |
| 7,299,177 B2 | 11/2007 | Broman et al. |
| 7,386,105 B2 | 6/2008 | Wasserblat |
| 7,403,922 B1 | 7/2008 | Lewis et al. |
| 7,539,290 B2 | 5/2009 | Ortel |
| 7,657,431 B2 | 2/2010 | Hayakawa |
| 7,660,715 B1 | 2/2010 | Thambiratnam |
| 7,668,769 B2 | 2/2010 | Baker et al. |
| 7,693,965 B2 | 4/2010 | Rhoads |
| 7,778,832 B2 | 8/2010 | Broman et al. |
| 7,822,605 B2 | 10/2010 | Zigel et al. |
| 7,908,645 B2 | 3/2011 | Varghese et al. |
| 7,940,897 B2 | 5/2011 | Khor et al. |
| 8,036,892 B2 | 10/2011 | Broman et al. |
| 8,073,691 B2 | 12/2011 | Rajakumar |
| 8,112,278 B2 | 2/2012 | Burke |
| 8,145,562 B2 | 3/2012 | Wasserblat et al. |
| 8,253,797 B1 | 8/2012 | Maali et al. |
| 8,311,826 B2 | 11/2012 | Rajakumar |
| 8,510,215 B2 | 8/2013 | Gutierrez |
| 8,537,978 B2 | 9/2013 | Jaiswal et al. |
| 9,001,976 B2 | 4/2015 | Arrowood |
| 10,477,012 B2 | 11/2019 | Rao et al. |
| 10,484,532 B1 | 11/2019 | Newman et al. |
| 2001/0026632 A1 | 10/2001 | Tamai |
| 2002/0022474 A1 | 2/2002 | Blom et al. |
| 2002/0099649 A1 | 7/2002 | Lee et al. |
| 2003/0009333 A1 | 1/2003 | Sharma et al. |
| 2003/0050780 A1 | 3/2003 | Rigazio |
| 2003/0050816 A1 | 3/2003 | Givens et al. |
| 2003/0063133 A1 | 4/2003 | Foote et al. |
| 2003/0097593 A1 | 5/2003 | Sawa et al. |
| 2003/0147516 A1 | 8/2003 | Lawyer et al. |
| 2003/0203730 A1 | 10/2003 | Wan et al. |
| 2003/0208684 A1 | 11/2003 | Camacho et al. |
| 2004/0029087 A1 | 2/2004 | White |
| 2004/0105006 A1 | 6/2004 | Lazo et al. |
| 2004/0111305 A1 | 6/2004 | Gavan et al. |
| 2004/0131160 A1 | 7/2004 | Mardirossian |
| 2004/0143635 A1 | 7/2004 | Galea |
| 2004/0164858 A1 | 8/2004 | Lin |
| 2004/0167964 A1 | 8/2004 | Rounthwaite et al. |
| 2004/0169587 A1 | 9/2004 | Washington |
| 2004/0203575 A1 | 10/2004 | Chin et al. |
| 2004/0240631 A1 | 12/2004 | Broman et al. |
| 2004/0257444 A1 | 12/2004 | Maruya et al. |
| 2005/0010411 A1 | 1/2005 | Rigazio |
| 2005/0043014 A1 | 2/2005 | Hodge |
| 2005/0076084 A1 | 4/2005 | Loughmiller et al. |
| 2005/0125226 A1 | 6/2005 | Magee |
| 2005/0125339 A1 | 6/2005 | Tidwell et al. |
| 2005/0185779 A1 | 8/2005 | Toms |
| 2005/0273442 A1 | 12/2005 | Bennett et al. |
| 2006/0013372 A1 | 1/2006 | Russell |
| 2006/0106605 A1 | 5/2006 | Saunders et al. |
| 2006/0107296 A1 | 5/2006 | Mock et al. |
| 2006/0149558 A1 | 7/2006 | Kahn |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0251226 A1 | 11/2006 | Hogan et al. |
| 2006/0282660 A1 | 12/2006 | Varghese et al. |
| 2006/0285665 A1 | 12/2006 | Wasserblat et al. |
| 2006/0289622 A1 | 12/2006 | Khor et al. |
| 2006/0293891 A1 | 12/2006 | Pathuel |
| 2007/0041517 A1 | 2/2007 | Clarke et al. |
| 2007/0071206 A1 | 3/2007 | Gainsboro et al. |
| 2007/0074021 A1 | 3/2007 | Smithies et al. |
| 2007/0100608 A1 | 5/2007 | Gable et al. |
| 2007/0124246 A1 | 5/2007 | Lawyer et al. |
| 2007/0208569 A1 | 9/2007 | Subramanian et al. |
| 2007/0244702 A1 | 10/2007 | Kahn et al. |
| 2007/0280436 A1 | 12/2007 | Rajakumar |
| 2007/0282605 A1 | 12/2007 | Rajaku Mar |
| 2007/0288242 A1 | 12/2007 | Spengler |
| 2008/0010066 A1 | 1/2008 | Broman et al. |
| 2008/0114612 A1 | 5/2008 | Needham et al. |
| 2008/0154609 A1 | 6/2008 | Wasserblat et al. |
| 2008/0181417 A1 | 7/2008 | Pereg et al. |
| 2008/0195387 A1 | 8/2008 | Zigel et al. |
| 2008/0222734 A1 | 9/2008 | Redlich et al. |
| 2009/0033519 A1 | 2/2009 | Shi et al. |
| 2009/0046841 A1 | 2/2009 | Hodge |
| 2009/0059007 A1 | 3/2009 | Wagg et al. |
| 2009/0106846 A1 | 4/2009 | Dupray et al. |
| 2009/0119106 A1 | 5/2009 | Rajakumar et al. |
| 2009/0147939 A1 | 6/2009 | Morganstein et al. |
| 2009/0247131 A1 | 10/2009 | Champion et al. |
| 2009/0254971 A1 | 10/2009 | Herz et al. |
| 2009/0304374 A1 | 12/2009 | Fruehauf et al. |
| 2009/0319269 A1 | 12/2009 | Aronowitz |
| 2010/0114744 A1 | 5/2010 | Gonen |
| 2010/0228656 A1 | 9/2010 | Wasserblat et al. |
| 2010/0303211 A1 | 12/2010 | Hartig |
| 2010/0305946 A1 | 12/2010 | Gutierrez |
| 2010/0305960 A1 | 12/2010 | Gutierrez |
| 2010/0329546 A1 | 12/2010 | Smith |
| 2011/0004472 A1 | 1/2011 | Zlokarnik |
| 2011/0026689 A1 | 2/2011 | Metz et al. |
| 2011/0069172 A1 | 3/2011 | Hazzani |

(56) References Cited

U.S. PATENT DOCUMENTS

| | | |
|---|---|---|
| 2011/0191106 A1 | 8/2011 | Khor et al. |
| 2011/0255676 A1 | 10/2011 | Marchand et al. |
| 2011/0282661 A1 | 11/2011 | Dobry et al. |
| 2011/0282778 A1 | 11/2011 | Wright et al. |
| 2011/0320484 A1 | 12/2011 | Smithies et al. |
| 2012/0053939 A9 | 3/2012 | Gutierrez et al. |
| 2012/0054202 A1 | 3/2012 | Rajakumar |
| 2012/0072453 A1 | 3/2012 | Guerra et al. |
| 2012/0253805 A1 | 10/2012 | Rajakumar et al. |
| 2012/0254243 A1 | 10/2012 | Zeppenfeld et al. |
| 2012/0263285 A1 | 10/2012 | Rajakumar et al. |
| 2012/0284026 A1 | 11/2012 | Cardillo et al. |
| 2013/0016819 A1 | 1/2013 | Cheethirala |
| 2013/0163737 A1 | 6/2013 | Dement et al. |
| 2013/0197912 A1 | 8/2013 | Hayakawa et al. |
| 2013/0253919 A1 | 9/2013 | Gutierrez et al. |
| 2013/0283378 A1 | 10/2013 | Costigan et al. |
| 2013/0300939 A1 | 11/2013 | Chou et al. |
| 2015/0055763 A1 | 2/2015 | Guerra et al. |
| 2015/0288791 A1* | 10/2015 | Weiss .................... H04M 3/436 379/189 |
| 2018/0075454 A1 | 3/2018 | Claridge et al. |
| 2019/0020759 A1* | 1/2019 | Kuang .................... G06N 20/00 |
| 2019/0114649 A1 | 4/2019 | Wang et al. |
| 2019/0268354 A1* | 8/2019 | Zettel, II .................... H04L 63/20 |

FOREIGN PATENT DOCUMENTS

| | | |
|---|---|---|
| JP | 2004-193942 | 7/2004 |
| JP | 2006-038955 | 9/2006 |
| WO | 2000/077772 | 12/2000 |
| WO | 2004/079501 | 9/2004 |
| WO | 2006/013555 | 2/2006 |
| WO | 2007/001452 | 1/2007 |
| WO | 2010/116292 | 10/2010 |

OTHER PUBLICATIONS

Roger A. Leite et al., EVA: Visual Analytics to Identify Fraudulent Events, Jan. 1, 2018, IEEE Transactions on Visualization and Computer Graphics, vol. 24, No. 1, pp. 330-339 (Year: 2018).*

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

ETSI TS 102 232-5 v2.1.1, "Lawful Interception (LI); Handover Interface and Service Specific Details (SSD) for IP delivery; Part 5: Service-specific details for IP Multimedia Services," Feb. 2007, 25 pages.

ETSI TS 102 657 v1.4.1, "Lawful Interception (LI); Retained data handling; Handover interface for the request and delivery of retained data," Dec. 2009, 92 pages.

Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

Girardin, Fabien, et al., "Detecting air travel to survey passengers on a worldwide scale," Journal of Location Based Services, 26 pages.

Hayes, M.H., "Statistical Digital Signal Processing and Modeling," J. Wiley & Sons, Inc., New York, 1996, 200 pages.

Lailler, C., et al., "Semi-Supervised and Unsupervised Data Extraction Targeting Speakers: From Speaker Roles to Fame?" Proceedings of the First Workshop on Speech, Language and Audio in Multimedia (SLAM), Marseille, France, 2013, 6 pages.

Meyer, Ulrike, et al., "On the Impact of GSM Encryption and Man-in-the-Middle Attacks on the Security of Interoperating GSM/UMTS Networks," IEEE, 2004, 8 pages.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Strobel, Daehyun, "IMSI Catcher," Seminararbeit Ruhr-Universität Bochum, Chair for Communication Security, Prof. Dr.-Ing. Christof Paar, Jul. 13, 2007, 28 pages.

Vedaldi, Andrea, "An implementation of SIFT detector and descriptor," University of California at Los Angeles, 7 pages.

* cited by examiner

Score Report
Some subheader text if we have some

📞 1877   ⊖ 457   📅 ND   👁 None

State
Epsum factorial non deposit quid pro quo hic escorol.

Under Review

Score History
Some subheader text if we have some

Events
Some subheader text if we have some

❗ ⊛ Mar 29, 2018 1:00 PM

| Interval | Last 7 Days |
|---|---|
| Risk Score | 80 |
| Behavior Score | 65 |
| Caller ID score | 5 |
| Invalid Number Score | 0 |
| Reputation Score | 5 |
| Combinations Score | 5 |

USER INTERFACE FOR FRAUD ALERT MANAGEMENT

CROSS-REFERENCE TO RELATED APPLICATIONS

This application claims the benefit of priority to U.S. Provisional Application No. 62/671,046 filed May 14, 2018, the disclosure of which is incorporated herein by reference in its entirety.

BACKGROUND OF THE INVENTION

Field of the Invention

Embodiments of the present invention relate to a graphical user interface, specifically a graphical user interface and information provided thereby for use in fraud alert management.

Background

According to the Identity Theft Resource Center, there were 781 tracked data breaches in 2015 where consumer data was stolen. There are many more breaches that go undetected or unreported. 338 of these breaches resulted in over 164 million social security numbers being stolen. Social security numbers are much more valuable to a fraudster than a credit card number. Credit card accounts can be closed, but social security numbers provide an ongoing opportunity for fraudulent activity. In 2016 the number of breaches increased to 1,091 and there have already been over 1,000 in 2017 including the Equifax breach where 143M social security numbers were compromised. According to Javelin, losses attributable to identity theft topped $16B.

Fraudsters take the stolen data and systematically attack the consumer, enterprises and government entities through the contact center and particularly the associated interactive voice response (IVR) system, the self-service channel. The IVR provides the means for a fraudster to access account information in anonymity without facing any interrogation by an agent.

In a 2016 Aite Group study, 78% of financial services executives indicated that fraud in the contact center is on the increase. 17% of financial services executives indicated that they did not know, likely because they do not have the processes in place to identify the fraud in the call center, let alone prevent it. Account Takeover (ATO) fraud accounts for 28% of all identity theft fraud in financial services and has a 10% compound annual growth rate (CAGR). Fraudulent activity is so prevalent in the contact center and IVR that Aite says, "Account Takeover is so commonly enabled in the contact center that it should be renamed the cross-channel fraud enablement channel."

Accordingly, there is a need for systems to help detect and prevent fraud, particularly fraud via IVR systems.

BRIEF SUMMARY OF THE INVENTION

Accordingly, the present invention is directed to a user interface for fraud alert management that obviates one or more of the problems due to limitations and disadvantages of the related art.

In accordance with the purpose(s) of this invention, as embodied and broadly described herein, this invention, in one aspect, relates to a user interface for a fraud detection application, the user interface comprising: a visual display; a plurality of panes displayed on the visual display, each pane including: an identifier corresponding to a communication received; a graphical representation of a threat risk associated with the identifier; a numeric score associated with the threat risk, wherein the numeric score is a weighted score based on a plurality of predetermined factors updated substantially continuously.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate examples of user interface for fraud alert management. Together with the description, the figures further serve to explain the principles of a user interface for fraud alert management described herein and thereby enable a person skilled in the pertinent art to make and use the user interface for fraud alert management.

DETAILED DESCRIPTION

Figure 1:
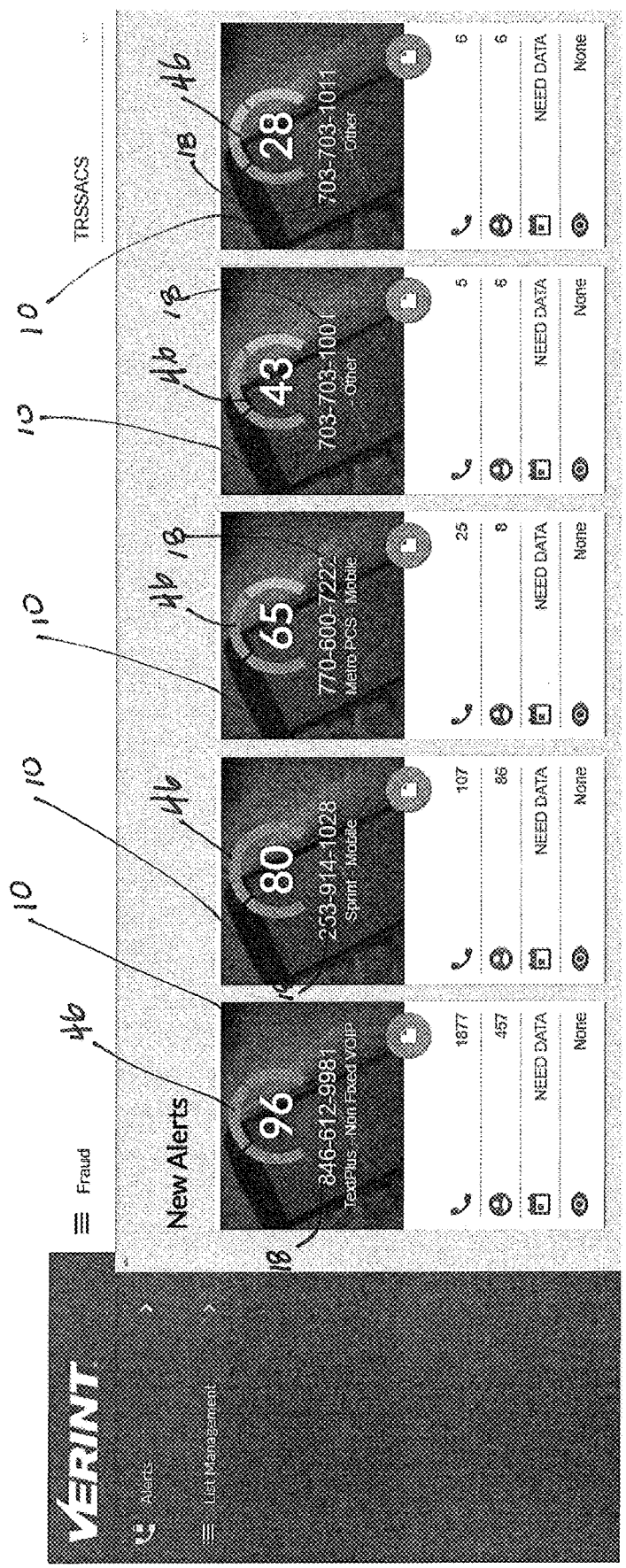
FIG. 1 is an exemplary initial view of a user interface for list management.

Reference will now be made in detail to embodiments of the user interface for fraud alert management with reference to the accompanying figures, in which like reference numerals indicate like elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

According to principles described herein, a user interface for fraud alert management provides a visual representation and integrated functionality to a user. Typically, the user would be a fraud analyst. Often, such analysts are tasked with evaluating the risk level of a caller or phone number.

In the process of identifying of whether a particular caller or phone number (ANI) 18 represents a risk requiring further investigation, information about a call would be received from the IVR. The present system uses rules based and a learning system (artificial intelligence) to process and continually update information presented in a usable fashion to the analyst via the user interface.

As illustrated in FIG. 1, an initial view of the user interface shows information important to the analyst for determining whether the caller or phone number represents a threat. Each "pane" 10 in the window 14 corresponds to a caller or phone numbers 18 associated with recent calls to the IVR.

Figure 2:
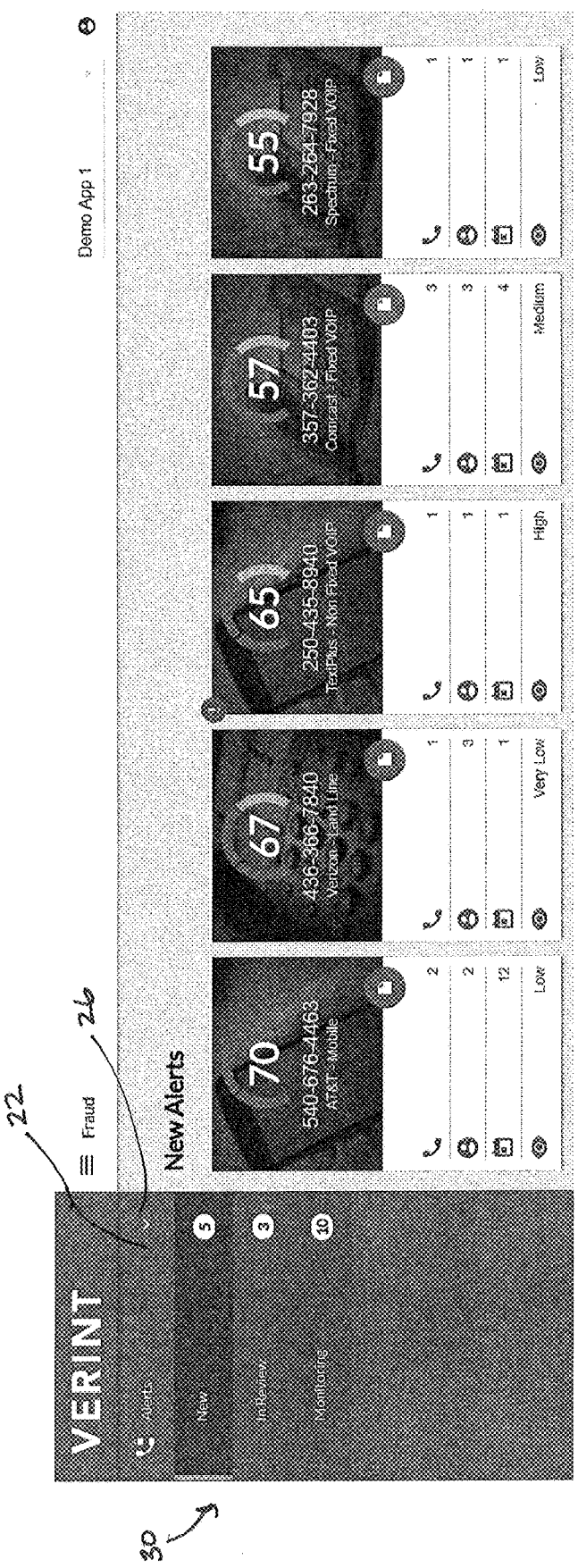
FIG. 2 is an exemplary initial view of a user interface according to principles described herein illustrating exemplary alerts.

FIG. 2 is an exemplary initial view of a user interface according to principles described herein illustrating exemplary alerts. As illustrated, information most import to a fraud analyst may be presented "by default" (e.g., new Fraud Alerts). As shown, the side bar 22 on the left provides quick navigation to remaining options (e.g, menu buttons 26 reveal/hide the side bar 22 and further sorting or functionality). E.g., selecting the arrows expands or hides sub-menus 30.

Figure 3:
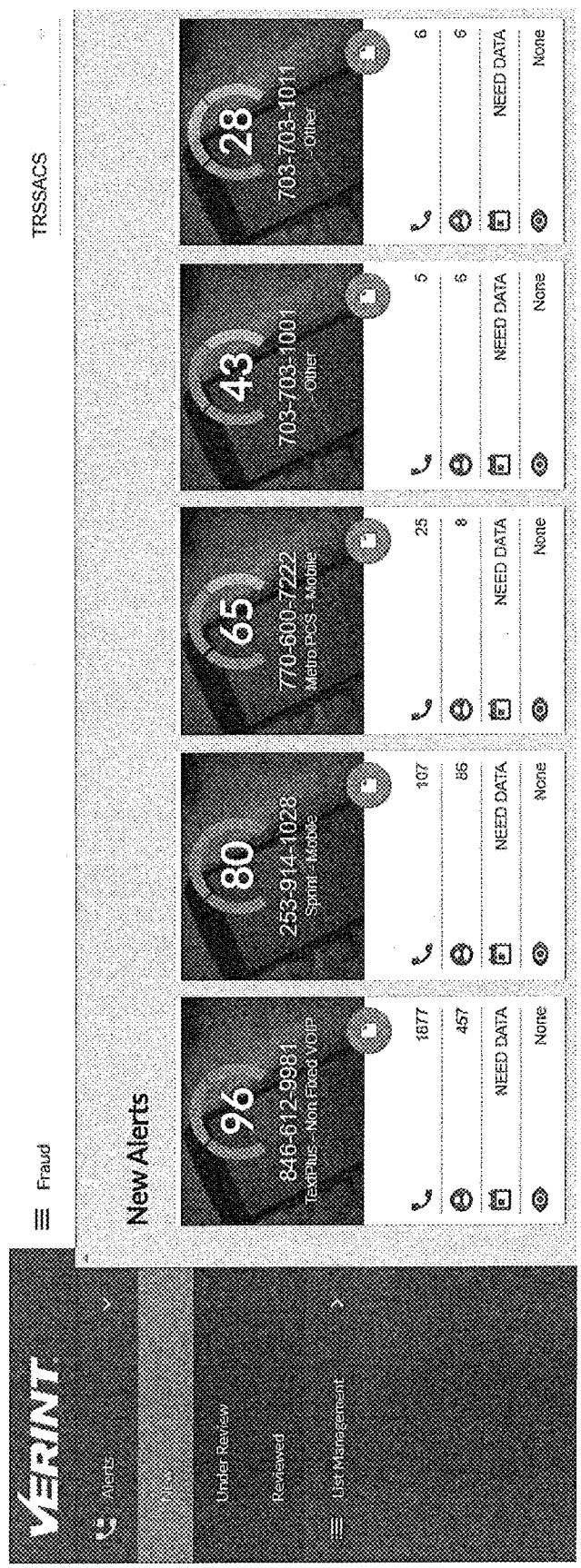
FIG. 3 is an exemplary initial view of a user interface for sorting according to status of an alert.

As shown in FIGS. 2 and 3, a menu of available screens, which may represent filters or sorting of the information, may be provided. In the example of FIG. 3, "Alerts" and "List Management" are provided as upper level screens, but the upper level screen access may be provided in another form that would be useful depending on the work flow of the analyst and the fraud review team. As further illustrated in this example, "alerts" may be further broken down into new, under review, and reviewed. In this example, "new" refers to potential fraud that has been recently detected (or evaluated based on the caller or phone number), "under review" refers to alerts that have been seen by an analyst and are in the process of determining whether fraudulent activity has occurred; and "reviewed" indicates that the analysis has been completed. A reviewed ANI can be placed on a blacklist if it is confirmed to be fraudulent, on a whitelist if the number is associated as a test number or an enterprise number, and kept in a monitoring state if there was no fraudulent activity detected. The screens/sort may further indicate disposition or referral of the incident, caller or phone number 18 to other fraud related activities or downstream analysts or functions, such as customer alerts, or closing of the incident. The screen may indicate age of the call, analyst assigned, risk level, under review, reviewed, closed, disposition, etc. A single analyst may see only his or her own assigned incidents or may be authorized or able to see system-wide calls. In the example of FIG. 2, the side bar menu 22 may include a category "Monitoring", which indicates an analyst has completed review and is monitoring for additional activity.

Figure 4:
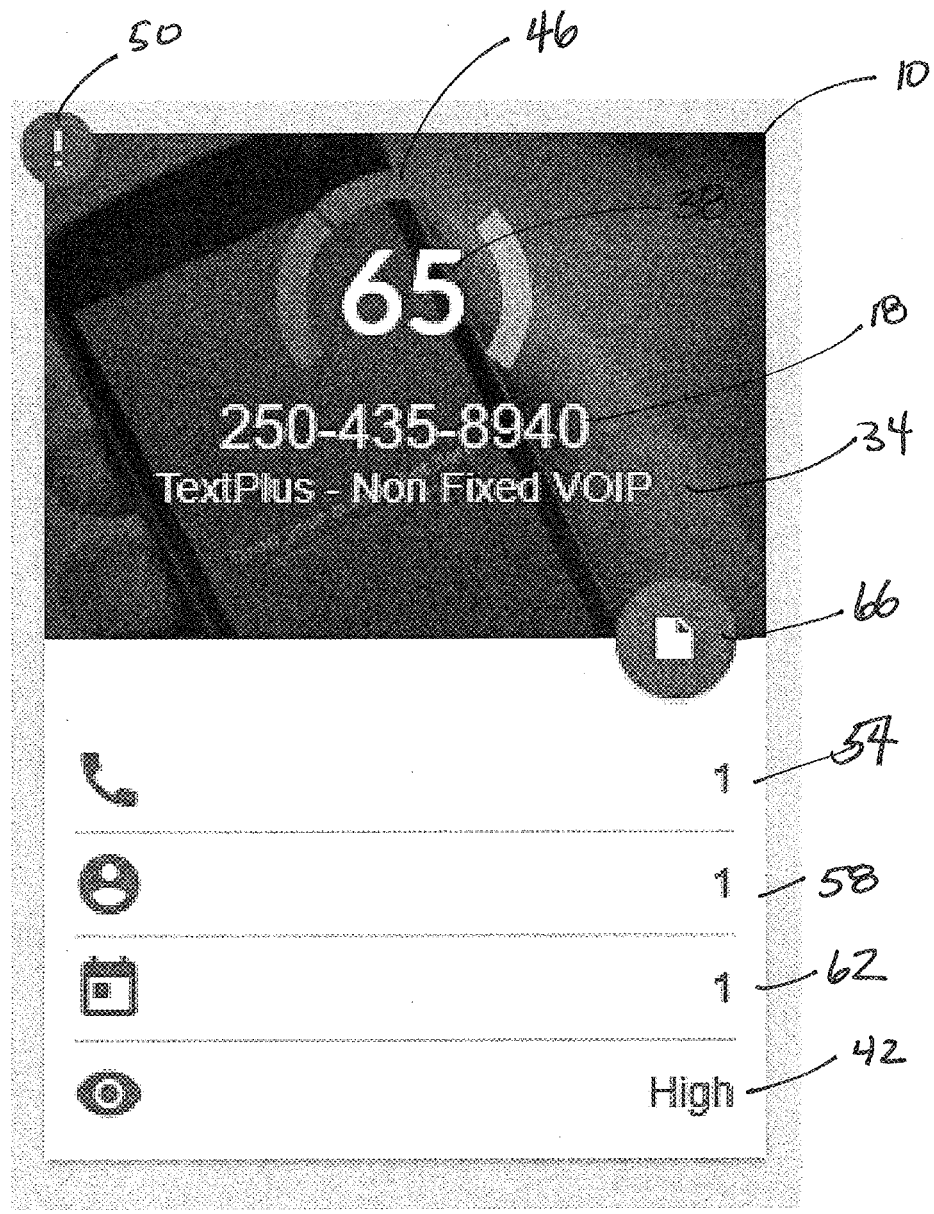
FIG. 4 is an exemplary individual pane associated with a single caller or phone number.

As shown in FIG. 4, each caller or phone number (ANI) 18 is provided in a single "pane" 10 as an alert summary in the user interface along with a plurality associated information. As illustrated in FIG. 4, the pane 10 may include channel information 34 such as whether access to the IVR is made by phone or other means (e.g., chat, web, email, etc.) For the purposes of the illustration in FIG. 4, the description refers to phone calls. The alert summary may include a score 38 and threat level. For example, a numerical score 38 may be provided where the score is associated with the caller or phone number 18. As illustrated in FIG. 3 in particular, the exemplary score 38 is 65 on a scale of 1-100. The score 38 may take into account a variety of information, including, but not limited to behavior data (e.g., what a caller does in a call; behavior patterns), telecommunications data (e.g. the carrier, whether the phone number is a working number, landline versus cellular, fixed or non-fixed VOIP, etc.) and reputation/history data (e.g., reputation/history indicates how long has this number been active and how does their current behavior compare to past behavior. A Blacklist would indicate that the number had previously been used in fraud). Spoof risk 42 is a separate score visible in the UI as the last icon on each high level tile.

Each of these information sources may be taken into account individually or in combination to provide a total weighted aggregate score 38. Thresholds may be set to indicate whether the numerical score is indicative of the caller or phone number 18 being a high fraud risk, an elevated fraud risk, a low level threat or not considered a threat.

Further, a graphical bar 46 may be provided to illustrate at a glance the level of risk associated with the caller or phone number 18. As illustrated in FIG. 4, an exemplary status bar 46 is broken into three sections, which may be selectively illuminated based on the level of risk as indicated by the associated score thresholds. For example, as illustrated in the first pane 10 of FIG. 1, the exemplary caller has a risk score of 96, which is considered "high risk", so that all three portions of the status bar 46 are illuminated. Referring again to FIGS. 1 and 2, a score of 65 or 43 is considered elevated risk, such that only two portions of the status bar are illuminated; a score of 28 is considered a low-level threat, such that only one portion of the status bar is illuminated. Although not shown, a numeric score of less than, e.g., 20, would be indicative of no threat, and thus no portions of the status bar would be illuminated. That is, in this exemplary embodiment, the visual representation of the threat risk presented to the analyst is broken down as follows: High Threat: 3 bars; Elevated Threat: 2 bars; Low Threat: 1 bar; No Threat: 0 bars (if used).

Figure 5:
FIG. 5 is an exemplary view of additional information available associated with a caller or phone number.
Figure 5:
Figure 5:
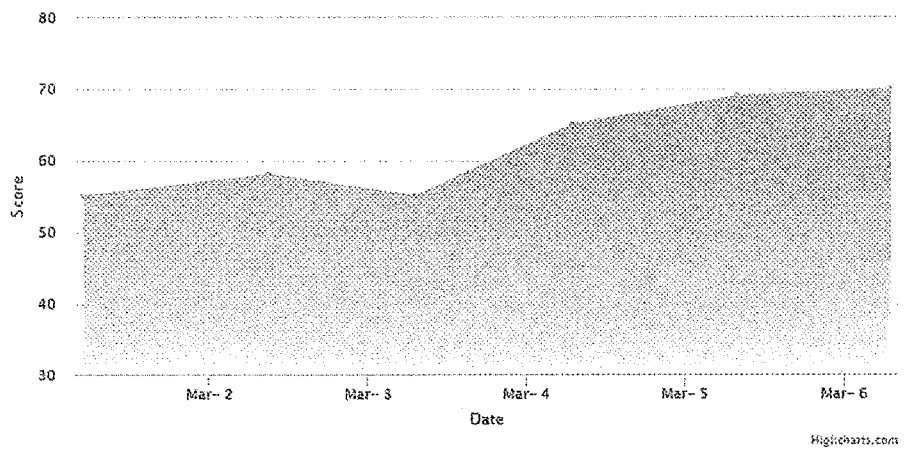
Figure 6:
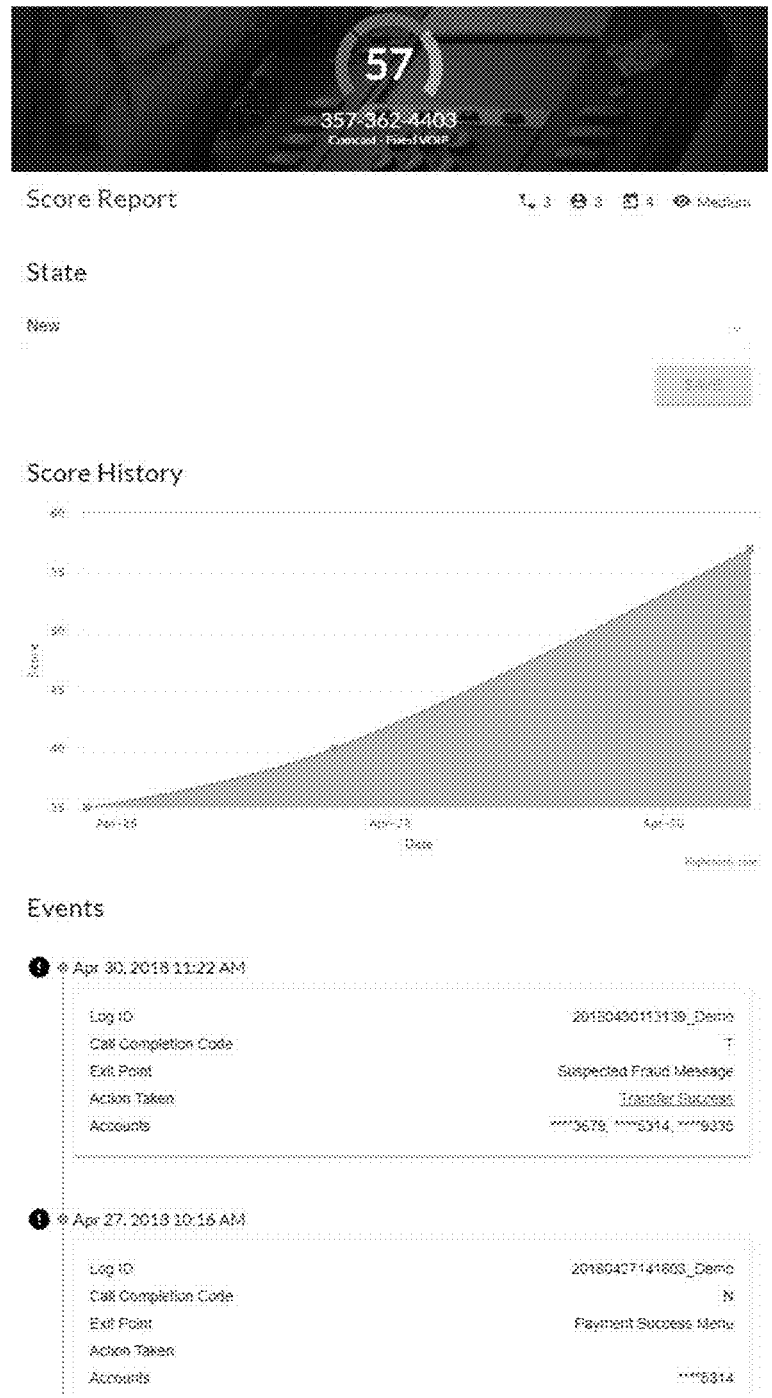
FIG. 6 further illustrates event details that may be available to an analyst.

The single pane 10 may also include other information relevant to the fraud assessment for an analyst, including but not limited to channel information 34 such as, for phone calls: Phone number, carrier, and line type, and for other channel types, an indication of the channel by which the IVR is accessed, such as chat, web, email, etc. The pane 10 may further include a line risk indicator 50 (carrier/line correlation with fraudulent activity); events 54 (number of times application has been accessed via specified channel identifier); accounts 58 (different Accounts accessed via specified channel identifier); user active duration 62 (days user has accessed the system via the indicated channel); spoof risk 42 (level of threat that channel identifier has been spoofed); and a button 66 for access to detailed information about the alert, as shown, for example in FIG. 5. FIG. 6 further illustrates event details such as score and threat level; channel information; score report (which may be the same data as shown on Summary card); state management; Select new status from menu, then Save button to update; Score History. The chart further illustrates a risk score for channel identifier over time; Events and additional details for each event where the channel identifier accessed the application. As shown n FIG. 6, the Alert Details may provide a hyperlink labeled Transfer Success. This hyperlink pulls up the voice recording of the agent/caller interaction enabling the fraud analyst to easily combine activity and scoring from the IVR with the agent interaction to have a holistic view of the interaction.

While the information is organized in a particular way in the embodiment of FIG. 4, the exact layout of the user interface is not so limited. The information provided to the analyst in the alert summary may include, but is not limited to, the number of accounts accessed or attempted to be accessed by the caller or phone number 18, active duration such as the number of days a user has accessed the system via the channel (e.g., phone number 18), a risk of whether the phone number is a spoofed number, the number of calls for the caller or phone number 18 in a defined time period. The time period may be a rolling time period or a specified fixed time period. The pane 10 may also include an alert, which may be an activatable virtual button to that leads to further information or background information relevant to the fraud risk evaluation, as illustrated in FIG. 5. Such further information may include historical data or scores over a predetermine period of time, etc.

The system may include the capability to set up user profiles to define the scope of accessibility that a user is allowed. Example user profiles may include "super user" who can access any area for any customer; "admin" who has access to set up other users within a customer domain; "manager/supervisor" who has access to customer specific data; and "analyst" who has access to limited areas within the customer domain.

A "management view" may also be provided, where the management view may access to KPIs (key performance indicators) related to the fraud detection, alerts, analyst performance and overall system functionality. The management view provides additional insight into the workflow aspect of a fraud event providing high level and detailed information into when an alert was initiated, current status of an alert, the final disposition of the alert including timelines and the analyst who worked the alert.

During an IVR call or communication, the associated caller or the phone number is scored on a scale of 1 to 99 and if the score exceeds a certain level defined by business rules it may trigger an alert and be referred to a fraud specialist to determine whether the caller presents a fraud risk, require additional stepped up authentication, trigger automated changes to the IVR callflow to change the access allowed to the caller or other dispositions based on business rules. Scores are determined by the analysis of behavioral data, telecom data and known history of a caller and account activity. Behavioral data may include: ANI velocity, account velocity, transfer velocity, call duration, goal attempt and completion, exit point, authentication methods and success/failure, application specific data (card REPIN, PIN probing, payments, bank transfers, access of closed or blocked cards, time of day. Telecom data may include: the line type (e.g., landline, cellular, fixed VOIP or non-fixed VOIP); whether there is a caller ID associated with the phone number or whether it is anonymous, is ANI actually in service, is the cell phone a prepaid cell phone, date number was last ported, spoof risk and geolocation. The history component looks at the account being accessed, previous access to this account, checks for ANI on blacklist and/or account on watchlist. This list is not exhaustive and may adapt over time.

The present disclosure provides a user interface for the fraud analyst to managed numerous alerts, e.g., by being able to take in a significant amount of information visually, organize that information, and obtain additional details as needed via the user interface.

When a call is received by the IVR, it is designated "new" and a pane 10 created on a fraud analyst's screen. The ANI (phone number) will only appear on the analyst screen if it is scored at a level to exceed a threshold to appear on the screen. The analyst may see many panes related to multiple callers/phone numbers at one time. The status bar offers a visual cue for the analyst to designate callers/phone numbers with low fraud risk as closed or otherwise change their status, while devoting attention to callers/phone numbers with a higher risk or moderate risk. The analyst may click on any of the links provided in a pane 10 associated with a particular caller/phone number and assess the underlying data available to determine disposition of the particular caller/phone number. Once the fraud analyst has determined disposition of the caller/phone number and the incident is may be passed to another analyst for more investigation or closed, such that the pane 10 can be removed from the view the analyst sees.

In addition to the features described above, the system may include authentication and authorization such that the system is secure and accessible only to registered users. The system can be configured so that each analyst only sees an application list specific to each analyst, e.g, only those incidents assigned to them or that they are allowed to work. A manager or administrator can modify these settings, e.g., granting or changing authorizations, assignments or access.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A system for fraud detection for a call center system, the system comprising:
    a processor; and
    a visual display in communication with the processor, the processor causing the visual display to present
    a plurality of panes displayed on the visual display, each pane including:
        an identifier corresponding to a communication received;
        a graphical representation of a threat risk associated with the identifier;
        a numeric score associated with the threat risk, wherein the numeric score is a weighted score based on a plurality of predetermined factors updated substantially continuously.

2. The system of claim 1, wherein the graphical representation includes:
    a status bar indicative of a threat risk associated with the identifier, the threat risk provided by the fraud detection algorithm and based on a weighted score.

3. The system of claim 2, wherein the communication is one of a phone call, a chat and a web interaction.

4. The system of claim 1, wherein each pane includes additional information about the identifier.

5. The system of claim 4, wherein the communication is one of a phone call, a chat and a web interaction.

6. The system of claim 1, wherein the additional information includes:
    a number of accounts accessed or attempted to be accessed associated with the identifier;
    a number of days the identifier has been active;
    a type of channel associated with the identifier; and
    a number of communications initiated by the identifier over a predetermined period of time;
    wherein a user may access further information by activating a portion of the visual display to access additional information related to the threat risk.

7. The system of claim 6, wherein the communication is one of a phone call, a chat and a web interaction.

8. The system of claim 1, wherein the communication is one of a phone call, a chat and a web interaction.

9. A non-transitory computer readable medium having stored thereon program instructions that, when executed by a processing system direct the processing system to:
   display a plurality of graphical panes on a visual display, a plurality of panes displayed on the visual display;
   cause each pane to display an identifier corresponding to a communication received, a graphical representation of a threat risk associated with the identifier; and a numeric score associated with the threat risk, wherein the numeric score is a weighted score based on a plurality of predetermined factors; and
   update the graphic representation of the threat risk and the numeric scores displayed substantially continuously.

10. The non-transitory computer readable medium of claim 9, wherein the program instructions, when executed by a processing system further direct the processing system to display a status bar indicative of a threat risk associated with the identifier, the threat risk provided by the fraud detection algorithm and based on a weighted score.

11. The non-transitory computer readable medium of claim 9, wherein the program instructions, when executed by the processing system, further direct the processing system to cause each pane to display additional information about the identifier.

12. The non-transitory computer readable medium of claim 11, wherein the additional information includes
   a number of accounts accessed or attempted to be accessed associated with the identifier;
   a number of days the identifier has been active;
   a type of channel associated with the identifier; and
   a number of communications initiated by the identifier over a predetermined period of time;
   wherein a user may access further information by activating a portion of the visual display to access additional information related to the threat risk.

13. The non-transitory computer readable medium of claim 9, wherein the communication is one of a phone call, a chat and a web interaction.

14. A method of presenting information to a user of a fraud detection application in a call center, the method comprising:
   displaying a plurality of graphical panes on a visual display, a plurality of panes displayed on the visual display;
   causing each pane to display an identifier corresponding to a communication received, a graphical representation of a threat risk associated with the identifier; and a numeric score associated with the threat risk, wherein the numeric score is a weighted score based on a plurality of predetermined factors; and
   updating the graphic representation of the threat risk and the numeric scores displayed substantially continuously.

15. The method of claim 14, further comprising display in each pane on the visual display a status bar indicative of a threat risk associated with the identifier, the threat risk provided by the fraud detection algorithm and based on a weighted score.

16. The method of claim 14, further comprising causing each pane to display additional information about the identifier.

17. The method of claim 16, wherein the additional information includes:
   a number of accounts accessed or attempted to be accessed associated with the identifier;
   a number of days the identifier has been active;
   a type of channel associated with the identifier; and
   a number of communications initiated by the identifier over a predetermined period of time;
   wherein a user may access further information by activating a portion of the visual display to access additional information related to the threat risk.

18. The method of claim 14, wherein the communication is one of a phone call, a chat and a web interaction.

* * * * *